(12) United States Patent
Denk (10) Patent No.: US 11,268,788 B2
(45) Date of Patent: Mar. 8, 2022

(54) LONG-RANGE OPTICAL SIGHTING DEVICE HAVING TARGET MARK ILLUMINATION

(71) Applicant: Leica Camera AG, Wetzlar (DE)

(72) Inventor: Robert Denk, Braunfels (DE)

(73) Assignee: Leica Camera AG, Wetzlar (DE)

( * ) Notice: Subject to any disclaimer, the term of this patent is extended or adjusted under 35 U.S.C. 154(b) by 252 days.

(21) Appl. No.: 15/759,131

(22) PCT Filed: Sep. 11, 2016

(86) PCT No.: PCT/DE2016/100421
§ 371 (c)(1),
(2) Date: Mar. 9, 2018

(87) PCT Pub. No.: WO2017/041792
PCT Pub. Date: Mar. 16, 2017

(65) Prior Publication Data
US 2018/0306553 A1    Oct. 25, 2018

(30) Foreign Application Priority Data
Sep. 11, 2015   (DE) .................... 10 2015 115 328.9

(51) Int. Cl.
*F41G 1/35* (2006.01)
*F41G 1/34* (2006.01)
(Continued)

(52) U.S. Cl.
CPC ............... *F41G 1/35* (2013.01); *F41G 1/345* (2013.01); *F41G 1/38* (2013.01); *F41G 1/387* (2013.01); *G02B 23/105* (2013.01); *G02B 27/34* (2013.01)

(58) Field of Classification Search
CPC ... F41G 1/35; F41G 1/38; F41G 1/387; F41G 1/345; F41G 1/36; G02B 23/105;
(Continued)

(56) References Cited

U.S. PATENT DOCUMENTS 5,943,174 A * 8/1999 Bryant .................... H01J 29/98
250/214 VT
7,269,920 B2 * 9/2007 Staley, III ................ F41G 1/38
42/111

(Continued)

FOREIGN PATENT DOCUMENTS

DE        203 20 158 U1   4/2004
DE   20 2005 008 874 U1   9/2005
(Continued)

OTHER PUBLICATIONS

International Preliminary Report on Patentability (PCT/IB/373) issued in PCT Application No. PCT/DE2016/100421 dated Mar. 13, 2018, including English Translation of Document C2 (German-language Written Opinion (PCT/ISA/237)) filed on Mar. 9, 2018 (nine (9) pages).

(Continued)

*Primary Examiner* — Stephone B Allen
*Assistant Examiner* — Rahman Abdur
(74) *Attorney, Agent, or Firm* — Crowell & Moring LLP (57) ABSTRACT

A long-range optical sighting device includes a housing, which comprises an objective, an eyepiece, a reversing system and a target mark. The target mark illumination is switchable and controllable via an operating platform. The operating platform has one or a plurality of manually actuatable switches arranged on the housing in the region of the eyepiece, on the top of the housing in the operating position, and a power supply. Control electronics and a light-sensitive sensor system for detecting the ambient brightness are integrated in the operating platform and/or the housing in the region of the eyepiece. The operating platform comprises one or a plurality of light entrance openings for the light-sensitive sensor system in the direction of the objective.

19 Claims, 5 Drawing Sheets

(51) Int. Cl.
*G02B 23/10* (2006.01)
*G02B 27/34* (2006.01)
*F41G 1/38* (2006.01)
*F41G 1/387* (2006.01)

(58) Field of Classification Search
CPC ........ G02B 27/34; G02B 23/10; G02B 27/36; G02B 23/00; G02B 23/14; G02B 27/017; G02B 27/0093; G02B 27/0172; G02B 23/12; G02B 23/04; A61B 8/13; A61B 90/37
USPC .......................................... 359/399
See application file for complete search history.

(56) References Cited

U.S. PATENT DOCUMENTS

| | | | |
|---|---|---|---|
| 8,950,101 B2* | 2/2015 | Schmitt | F41G 1/38 42/119 |
| 2007/0209268 A1* | 9/2007 | Birurakis | F41G 1/35 42/119 |
| 2012/0030985 A1* | 2/2012 | Mauricio | F41G 1/32 42/84 |
| 2014/0028994 A1* | 1/2014 | Wechselberger | G02B 23/14 356/3 |
| 2015/0369565 A1* | 12/2015 | Kepler | G02B 27/1066 348/143 |

FOREIGN PATENT DOCUMENTS

| | | |
|---|---|---|
| DE | 20 2010 012 352 U1 | 11/2010 |
| EP | 0 651 225 A1 | 5/1995 |
| ER | 2 674 802 A1 | 12/2013 |

OTHER PUBLICATIONS

International Search Report (PCT/ISA/210) issued in PCT Application No. PCT/DE2016/100421 dated Dec. 7, 2016 with English translation (four pages).

German-language Written Opinion (PCT/ISA/237) issued in PCT Application No. PCT/DE2016/100421 dated Dec. 7, 2016 (four pages).

* cited by examiner

LONG-RANGE OPTICAL SIGHTING DEVICE HAVING TARGET MARK ILLUMINATION

The invention relates to a long-range optical sighting device, in particular a telescopic sight, having switchable and controllable target mark illumination according to the preamble of claim 1.

Long-range optical sighting devices, such as telescopic sights, for example, usually comprise a target mark, also called reticle, with the aid of which a target can be sighted. In order to set an optimum contrast between target mark and target, provision is often made of a light source for illuminating the target mark.

The light source is usually embodied in a switchable fashion in order that it can be switched on or off as necessary by the user. In order to be able to adapt the illumination of the target mark to the light conditions and ambient conditions, for example day or twilight and night use, it is known for the luminous intensity or intensity of the light source to be embodied such that it is settable or controllable. To that end, two switch positions can be provided, in the case of which the luminous intensity is in each case manually individualized for example for a day or night use.

A switchable illumination device is known for example from DE 203 20 158 U1. The telescopic sight described therein comprises a target mark that is controllable with regard to optical-visual parameters, wherein a manually actuatable switch is provided, which is movable between two switch positions proceeding from an intermediate position. The illumination intensity is increased in a first switch position and reduced in a second switch position. The rotary switch, the illumination electronics and the power supply are integrated in the so-called reticle adjustment region for instance in the center of the telescopic sight and are thus arranged at a distance from the location of the reticle. However, the reticle itself that is to be illuminated is arranged in an image plane in proximity to the eyepiece, such that long electrical lines from the electronics in the reticle adjustment region to the reticle in the eyepiece region have to be laid in the interior of the telescopic sight. The line routing in the interior of the telescopic sight unfavorably restricts the interior space in the telescopic sight that is usable for the movable mechanism of the reticle adjustment and for the optical unit. The lines are situated in the region of the optical unit, such that undesired reflections are possible. Moreover, long electrical lines are susceptible to interference. The illumination intensity has to be manually adapted to changing ambient light conditions. Upon transition from daylight to late twilight, or vice versa, the luminous spot brightness has to be constantly adapted manually in order that the luminous spot does not swamp the target object sighted. Noises and unnecessary movements during this adaptation of the luminous spot brightness are unavoidable and adversely affect hunting. A frequent adaptation or readjustment in the event of a varying illumination situation, for example upon transition from twilight to darkness at night, leads to considerable noise disturbance, which is likewise disadvantageous for hunting.

DE 20 2005 008 874 U1 discloses a sighting device comprising a light source for illuminating a target mark, which comprises a control and regulating device that makes it possible to realize different operating modes with different luminous intensities of the illumination. In the case of this sighting device, too, the rotary switch, the illumination electronics and the power supply are arranged in the reticle adjustment region in the center of the telescopic sight.

Automatic brightness adaptations known per se involve the use of light sensors for detecting/measuring the ambient brightness. The light sensors are usually arranged on the exterior of a housing and generally detect the brightness. What is disadvantageous is that the sensors can be inadvertently masked, for example as a result of shading with the user's headgear or the moving of a raised hide for hunters. The light sensors can also be completely masked and deactivated by protective coverings slipped over the exterior of the telescopic sight, or protective caps provided for protecting the eyepiece and objective optical units. If the light sensor is shaded when there is high brightness, for example, the automatic brightness regulation results in a malfunction such that the reticle illumination is regulated to a minimum value in order not to swamp the imaging of the sighted target region in the interior of the telescopic sight. However, said minimum value has an excessively low brightness for bright light conditions and can no longer be perceived as a luminous spot by the observer. In order to avoid these malfunctions it is known to integrate such sensors with high outlay in the interior of the telescopic sight in the region of the optical unit and in this way to detect the brightness of the observation light beam entering through the optical unit and thus the brightness in the object plane to be observed. This arrangement necessitates a high space requirement for additional connectors, conductor strips and components in the confined interior of the telescopic sight. The conductor strips have to be protected against electrical interference (EMC) and laid past the optical unit and must not adversely affect the optical imaging by reflections. In this way, it is often the case that stray light can be detected by the light sensors only in the edge region. The light sensors generate weak signal currents that are scarcely able to be evaluated and are measurable only with difficulty. These solutions are unsuitable for telescopic sights having a small objective diameter. Moreover, they are complex and expensive since the production of a telescopic sight comprising an integrated sensor system involves having to mount firstly the optical unit and secondly also the internal electronics and to lay conductor strips in the interior of the telescopic sight. The structural set-up is furthermore inconvenient in respect of servicing.

It was therefore an object of the invention to avoid the demonstrated disadvantages of the prior art and to improve the sighting device to the effect that the light source of the target mark illumination, after being switched on again or after a change of operating mode, has an optimum illumination intensity as rapidly as possible or immediately and maintains or ensures it even under varying ambient light conditions. A further object of the invention was to reduce the outlay on costs for an automatically controllable target mark illumination and to be able to integrate the latter in known telescopic sight designs without having to recalculate or adversely affecting the optical design thereof.

In the case of a long-range optical sighting device of the type mentioned in the introduction, these objects are achieved according to the invention by means of the characterizing features of claim 1. The dependent claims relate to advantageous configurations.

A central concept of the invention is that of arranging light-sensitive sensors for detecting the ambient brightness in a sighting device, such as a telescopic sight, where power supply, switches and electronics e.g. for a manually settable target mark illumination are already present. In this way, e.g. an existing target mark illumination electronics circuit board can be cost-effectively extended by brightness measuring electronics and control for the target mark illumination. A modular design, with possibly functionally separated circuit boards arranged one above another, is likewise possible, such as double-sided population of an existing circuit board with additional electronic components for brightness measurement and intensity control for the illumination on the underside of the circuit board. In one particularly easily handleable embodiment of the invention, the light-sensitive sensors are arranged in a space-saving manner on the underside of the circuit board and connected to the control electronics.

What is essential to the invention, moreover, is the insight of arranging the light-sensitive sensors on the telescopic sight such that they are directly aligned with the scenery to be observed using the telescopic sight. An optimum luminous efficiency for the sensors and thus a brightness adaptation of the luminous reticle that is appropriate to the observation section in the best possible manner are ensured in this way. By way of example, if illumination electronics with power supply are integrated in the reticle adjustment region, e.g. in the adjustment turret for the vertical mechanical reticle adjustment, which is arranged on the top of the telescopic sight in the use position, according to the invention one or a plurality of light entrance openings for a light-sensitive sensor system can be provided in the direction of the objective on the front side of the adjustment turret. Such an arrangement is advantageous for telescopic sights comprising an illuminated reticle in the first image plane. In this case, the light-sensitive sensor system can be integrated in addition to the illumination electronics present and can be configured for the automatic brightness control of the target mark illumination.

In one embodiment of the invention that can be realized particularly well, in the case of a long-range optical sighting device or a telescopic sight which consists of an objective, an eyepiece, a reversing system arranged therebetween and a target mark in a housing, a switchable and controllable target mark illumination is provided. According to the invention, an operating platform having manually actuatable switches is arranged on the housing in the region of the eyepiece, on the top of the housing in the operating position, and a power supply, control electronics and a light-sensitive sensor system are integrated in the operating platform and/or the housing part in the region of the eyepiece. The operating platform can be embodied as a cylindrical attachment or in some other manner differing geometrically from the housing in the region of the eyepiece. The operating platform comprises one or a plurality of light entrance openings in the direction of the objective, advantageously in an edge region or a circumferential region of the operating platform in the direction of the objective, in order to be able to guide light onto the light-sensitive sensor system in the interior. In this way, it is possible to realize a short and thus interference-immune connection path between the light-sensitive sensor system and the electronics and additional conductor strips, cables or connection plugs are not required. Advantageously, the actual optical unit of the telescopic sight need not be altered or adapted in this way.

In order to guide light onto the light-sensitive sensor system in an improved manner, an optical waveguide to the sensor system can additionally be provided in the light entrance openings. Advantageously, the operating platform can also be sealed in this way, such that no moisture can penetrate. It is likewise possible to close the light entrance opening against penetration of moisture with an optical unit, such as a window, or a lens.

In one advantageous configuration of the invention, the light-sensitive sensor system is inserted in recesses in the operating platform and is connected to the control electronics via short electrical paths. In this way, additional components can be integrated without the external dimensions of the operating platform having to be enlarged. Light can be guided from the light entrance openings to the sensor system cost-effectively via channel-type milled-out portions in the housing material of the operating platform. The milled-out portions can be polished to a shiny finish in order to be able to collect light and guide it onto the light-sensitive sensor system. Advantageously, however, the light entrance openings contain an optical unit for guiding light onto one or a plurality of light-sensitive sensors. In this way, there is no need for mechanical measures on the housing part of the telescopic sight that contains the optical unit, such that an extension of the function is effected exclusively in the region of the operating platform and a protective gas filling of the optical unit is not impaired, or can be effected during the mechanical-optical production of the telescopic sight in a work process that is independent of the manufacture and mounting of the electronics for the illumination.

Advantageously, by means of a paired arrangement of two light entrance openings arranged in the edge region of the operating platform, overlapping light cones can be detected or light reception beams can be generated which, in the case of an alignment with the observation plane in the objective direction, would otherwise be shaded by a reticle turret or an objective having a large diameter. An overlap of the detected light cones of the sensor regions results in the generation of an overlap of a photogeometric sensitivity range near the optical axis which leads to the weighting of a central region of the observation plane and thus ensures a higher sensitivity in the center or the vicinity of the optical axis of the telescopic sight. This is particularly advantageous since even a luminous spot which is intended to be controlled in terms of its intensity is situated on the optical axis and can be driven correspondingly more brightly for reliable perception.

For protection against undesired influence of stray light and mechanical damage of the light entrance of the optical waveguides, the latter are arranged in a manner sunk in a for example milled-in recess in the operating platform. Alternatively, a light entrance opening can also be protected against mechanical influences by additional covering windows coated in a light-transmissive fashion or with a specific optical filter. As a further optimization measure, the contour of the operating platform can be altered for the mechanical protection of the optical waveguides and light entrance opening in such a way that the light entrance is shaded vis-à-vis stray light forming a disturbance laterally and from above. The same mechanical and optical protection effect can be achieved by separate protective funnels shaped around the entrance opening.

The intensity of the target mark illumination can be controllable either manually via switches present or automatically by the control electronics, depending on the ambient light conditions determined with the aid of the light-sensitive sensor system. In a simple manner, e.g. by means of a pivoting switch having three positions, which deactivates the target mark illumination in a rest or zero position, in a position pivoted toward the left, for example, it is possible to activate an uncontrolled mode, the intensity of which is manually adjustable, with a predefined brightness characteristic curve. In this setting, provision can be made for the predefined brightness characteristic curve to be shifted by the actuation of a further switch, for example of a rocker switch or rotary encoder, in a known manner in switching stages in such a way that the intensity of the target mark illumination is optimally adapted to the ambient light conditions and the user's visual perception.

In a position pivoted toward the right, for example, it is possible to realize an automatic, sensor-controlled mode for the intensity of the brightness of the target mark illumination.

In this pivoted position, it is possible firstly to realize a preprogrammed, non-sensor-based and predominantly constant intensity—set to a maximum value—of the target mark illumination for day illumination conditions. According to the invention, for the transition from day illumination conditions through to twilight or night illumination conditions, it is possible to realize an individual, sensor-based downward regulation of the intensity of the target mark illumination along a characteristic curve. In this setting, too, provision can be made for the predefined brightness characteristic curve to be shifted by the actuation of a further switch, for example a rocker switch or rotary encoder, in such a way that the intensity of the target mark illumination is optimally adapted to the ambient light conditions and the user's visual perception.

For users who would not like to rely on an automatic regulation of the intensity, a conventional manual mode can be provided in a position pivoted toward the left, for example.

In a further advantageous embodiment of the invention, in one pivoted position, it is possible to provide a sensor-based variable target mark illumination having a first characteristic curve for dark ambient illumination situations. This setting is e.g. particularly suitable for the transition from twilight to night darkness (afternoon-night stay in hide). In a second pivoted position, it is then possible to provide a sensor-based variable target mark illumination having a second characteristic curve for bright ambient illumination situations. This setting can then be optimized, e.g. for the transition from morning twilight to daylight brightness (morning and/or day stay in hide).

For manually setting the brightness in one or the other pivoted switch position, it is additionally possible to provide pressure-operated, pushbutton, rotary or rocker switches. If the pivoting switch is situated e.g. in the position for day stay in hide or the position for night stay in hide, the brightness can be increased using one of the switches and the brightness can be reduced using another of the switches. According to the invention, the level for the automatically controlled intensity of the target mark illumination can also alternatively be varied using the switches.

Particularly advantageously, the long-range optical sighting device comprises a programming interface for setting individual levels for the night and day settings. In this way, the dynamic range of the intensity, that is to say the absolute difference between the sensor-based settable minimum value and the maximum value, can be greater in the day setting than in the night setting. The operating platform or the housing in the eyepiece region for accommodating the reticle illumination can be embodied as detachable, in particular for programming purposes. In the detached state, contacts for a programming interface may be accessible; alternatively, programmings may also be able to be realized via a wireless radio interface, such as WLAN, Bluetooth, NFC or the like. For particularly cost-effective production, the arrangement of the sensors is designed for a short electrical connection to the control electronics, preferably directly on the electronics circuit board, in particular on the underside of the circuit board. Particularly advantageously, intelligent brightness sensors, into which amplifier and analog/digital converters are already integrated, are used. In this way, the layout of an existing target mark illumination need substantially only be changed slightly, since a digital output of a sensor can be connected directly to a digital input of a microprocessor that is possibly present anyway.

One exemplary embodiment of the invention is illustrated schematically in the drawing and is described in greater detail below with reference to the figures, in which.

Figure 1:
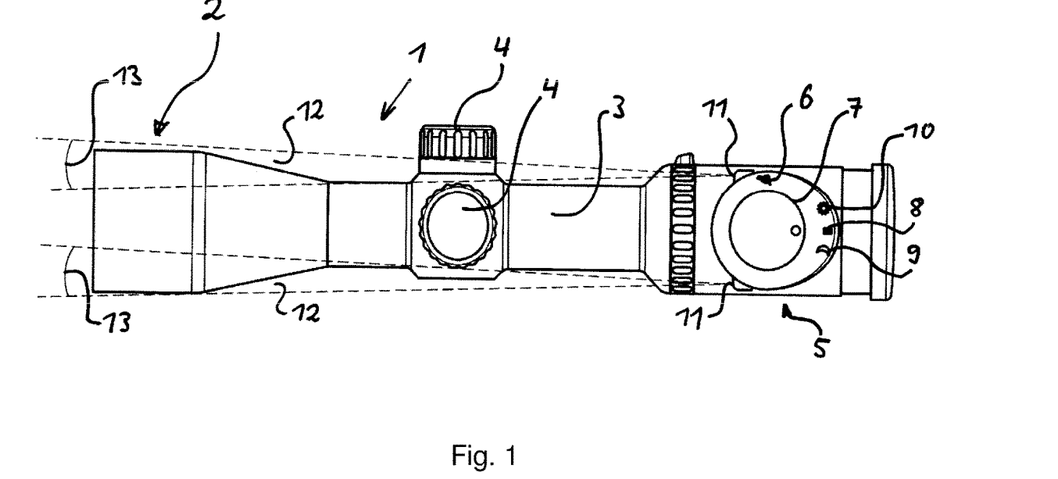
FIG. 1 shows a plan view of the telescopic sight

The telescopic sight 1 illustrated in FIG. 1 contains an objective 2, a tube housing 3 having adjustment turrets 4 for adjusting a reticle (not illustrated in any further detail) and an eyepiece 5. A cylindrical attachment 6 having integrated electronics elements, not illustrated in any further detail, is attached in the tube region of the eyepiece 5. The cylindrical attachment 6 is embodied as an operating platform and comprises a rotary/pivoting switch 7 having an integrated switching rocker (not illustrated). For a reticle illumination, not illustrated in any further detail, the rotary/pivoting switch 7 has a zero position 8, a night illumination position 9 and a day illumination position 10. Light entrance openings 11 are illustrated schematically in the side region or circumferential region of the operating platform 6 embodied as a cylindrical attachment. Conical light reception beams 12 are assigned to both light entrance openings 11. The light reception beams 12 each have an aperture angle 13 of between 2° and 20°. The respective aperture angle is preferably 10°.

Figure 2:
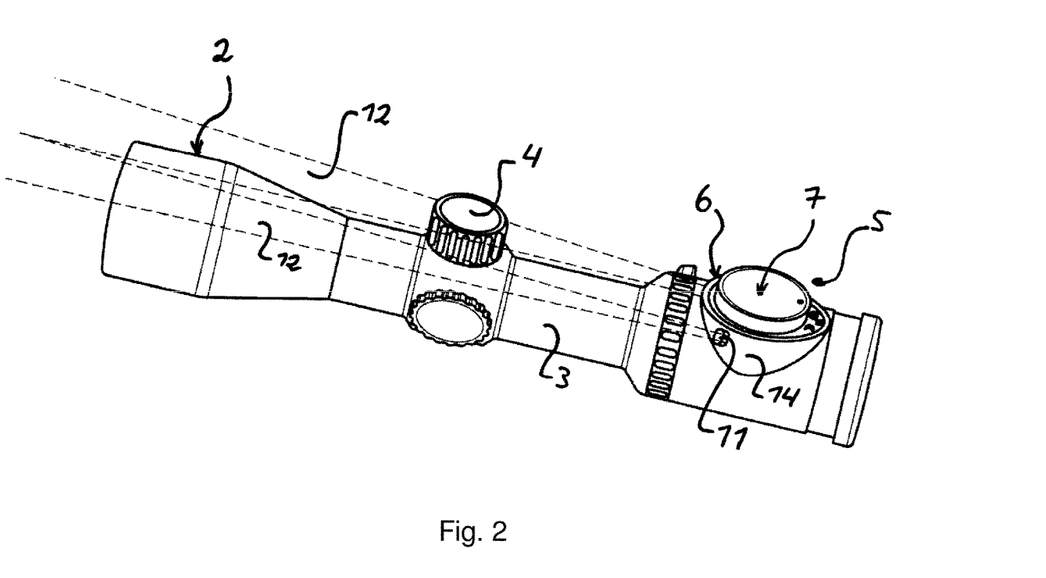
FIG. 2 shows a perspective view of the telescopic sight

The perspective view of the telescopic sight 1 as illustrated in FIG. 2 shows how the light reception beams 12 run between and respectively past the adjustment turrets 4 in the direction of the objective 2. A light entrance opening 11 is arranged in the edge region 14 of the operating platform 6.

Figure 3A:
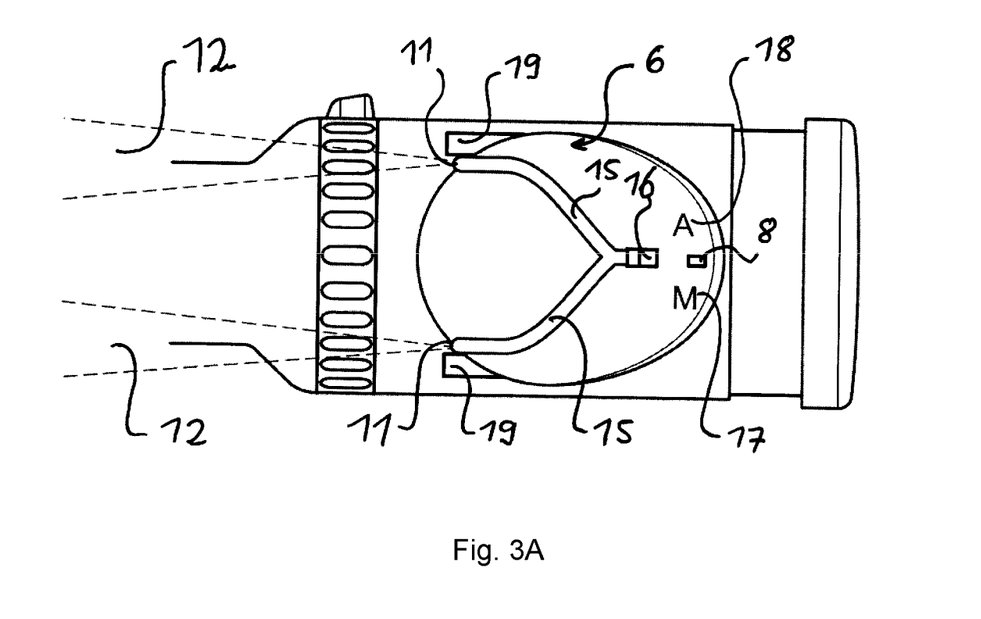
FIGS. 3A and 3B show a cross section through the operating platform with eyepiece region

FIG. 3A illustrates a plan view of the eyepiece region with a cross section of the operating platform 6. The light reception beams 12 impinge on the light entrance openings 11 and are guided via an optical unit 15 extending in a y shaped fashion and serving for guiding light onto an individual light-sensitive sensor system 16. For mechanical protection, the light entrance openings 11 are protected against laterally incident stray light rays by schematically illustrated contours 19 which are integrally formed laterally alongside the light entrance openings 11 in the edge region 14 of the operating platform 6 and which can also be embodied as separate protective funnels 19 shaped around the light entrance opening 11. A variant—implemented schematically in FIGS. 3A and 3B—of the rotary/pivoting switch 7 (FIGS. 1 and 2)—not illustrated on account of the cross sectional illustration—for setting further illumination modes has in this illustration a manual illumination setting 17 and an automatic illumination setting 18 besides the zero position 8, in which the reticle illumination is switched off.

Figure 3B:
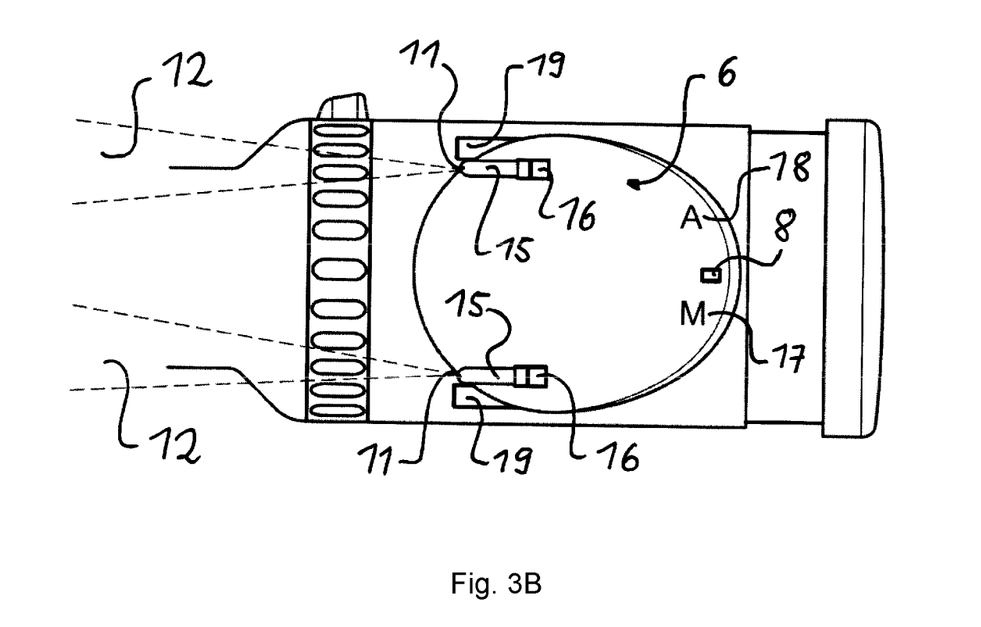

FIG. 3B likewise illustrates a plan view of the eyepiece region with a cross section of the operating platform 6. The light reception beams 12 impinge on the light entrance openings 11 protected by protective funnels 19. Separate optical units 15 for guiding light are assigned to each light entrance opening 11, said optical units guiding the incident light onto separate light-sensitive sensor systems 16. The light-sensitive sensor systems 16 are connected to an electronics circuit board (not illustrated) arranged in an integrated fashion in the operating platform 6.

Figure 4A:
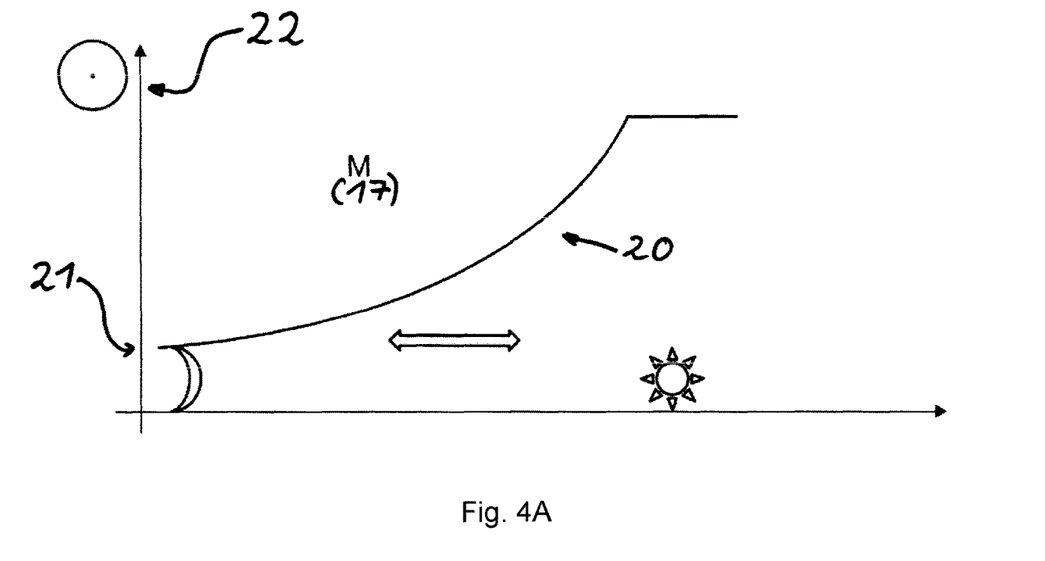
FIGS. 4A and 4B show a first and a second characteristic curve profile

The first characteristic curve profile 20 illustrated in FIG. 4A corresponds to a manual illumination setting 17. The intensity strength of the reticle illumination from a low (=reticle illumination dark) 21 to a high (=reticle illumination bright) 22 value is plotted on the y axis, identified by a dot in a circle. The values of the characteristic curve profile 20 can be selected or set by manual setting in switch stages, for example selected horizontally on the X axis by means of a switching rocker. In the low value range for night and twilight conditions, the intensity of the reticle illumination initially changes slowly and is then increased to a greater degree up to a maximum value (high intensity 22), illustrated schematically by a section of the characteristic curve profile 20 that runs parallel to the X axis.

Figure 4B:
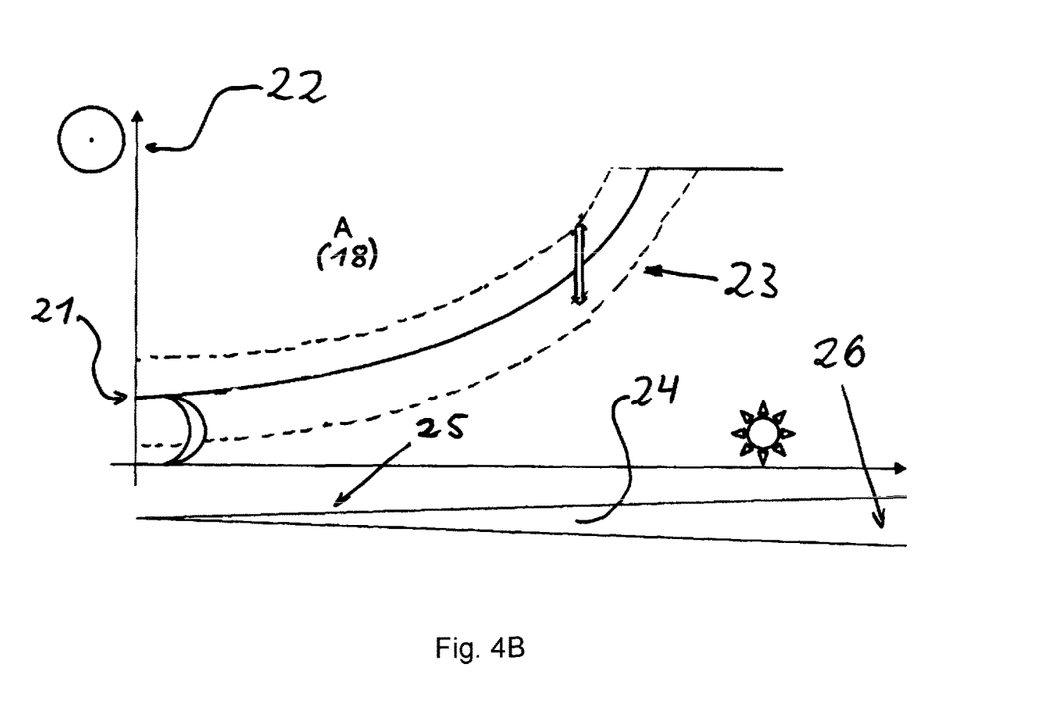

FIG. 4B illustrates a second characteristic curve profile 23, which is employed in a sensor controlled manner in the automatic illumination setting 18. In FIG. 4B, too, the Y axis is identified by a dot in a circle and corresponds to the intensity strength of the reticle illumination, beginning at a low (=reticle illumination dark) 21 to a high (=reticle illumination bright) 22 value. The preset or programmed characteristic curve profile 23 is illustrated by a solid curve with a curve section corresponding to a maximum value (high intensity 22) running parallel to the X axis. The intensity of the reticle illumination is controlled automatically on the basis of the sensor signal 24, illustrated as a funnel opening toward the right on the X axis. The narrow region 25 of the sensor signal 24 corresponds to dark night and twilight conditions in the observation plane, while the opening region 26 corresponds to the transition from morning twilight to daylight conditions. The brighter the light conditions in the observation plane, the greater, too, the sensor signal 24 and the higher the degree to which the intensity of the reticle illumination has to be controlled. The level of the second characteristic curve profile 23 can be increased or reduced by manual setting in switch stages for example using a switching rocker or via a programming interface, in the region of the transition from morning twilight to daylight conditions, and is illustrated schematically by dashed lines.

Figure 5:
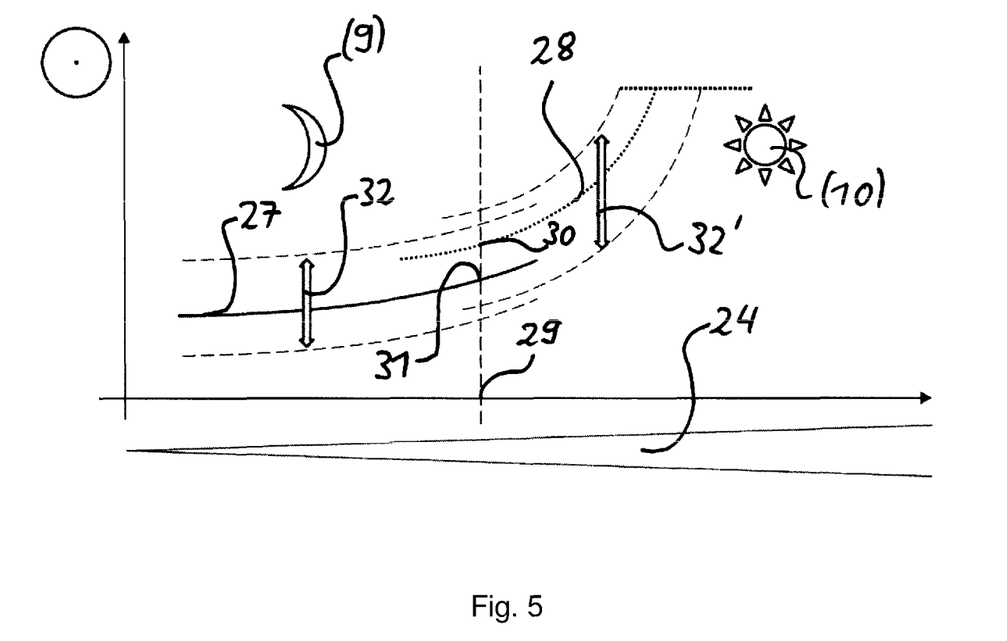
FIG. 5 shows a diagram with a plurality of characteristic curves.

FIG. 5 illustrates a diagram with a plurality of characteristic curves for an automatic reticle illumination controlled on the basis of the sensor signal 24. The characteristic curve 27 having a low resulting intensity for the reticle illumination is assigned to the night illumination setting 9 of the switch 7 from FIG. 1. The characteristic curve 28 having a higher resulting intensity for the reticle illumination is assigned to the day illumination setting 10. In this way, the intensity of the reticle illumination for the same value 29 of the sensor signal 24 in the day illumination setting 10 can have a different, e.g. higher, value 30, while the same brightness measured in the observation plane with the same value 29 of the sensor signal 24 in the night illumination setting 9 has a lower value 31. The level of the two characteristic curves 27 for night illumination and 28 for day illumination can be shifted within the scope of a bandwidth 32, 32' in the direction of the Y axis by means of manual setting in switch stages for example using a switching rocker or via a programming interface. The maximum variable level shift is illustrated schematically by double headed arrows 32 and clarified by dashed level lines.

Figure 6:
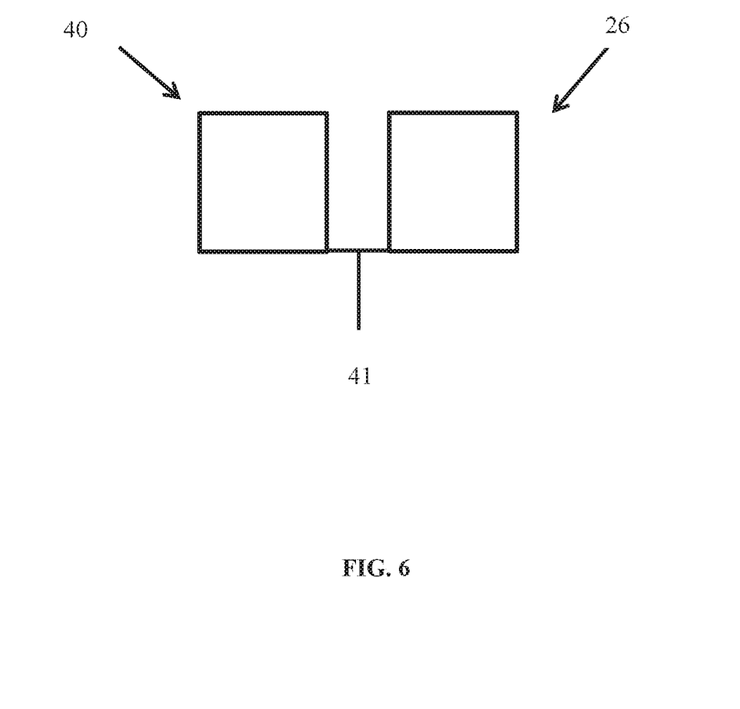
FIG. 6 is a diagram showing the connection between the sensors and the control electronics.

As shown in FIG. 6, the sensor 26 may configured for direct electrical connection, or electrical connection via a short line path (via 41), to the control electronics 40 in the operating platform.

LIST OF REFERENCE SIGNS

1 Telescopic sight
2 Objective
3 Tube housing
4 Adjustment turrets
5 Eyepiece
6 Cylindrical attachment/operating platform
7 Switch
8 Zero position
9 Night illumination position
10 Day illumination position
11 Light entrance openings
12 Light reception beam
13 Aperture angle
14 Edge region, circumferential region
15 Optical unit for guiding light
16 Light-sensitive sensor system
17 Manual illumination setting
18 Automatic illumination setting
19 Integrally formed contour/protective funnel
20, 23, 27, 28 Characteristic curve profiles
21 Low intensity reticle illumination
22 High intensity reticle illumination
24 Sensor signal
25 Narrow region of sensor signal (dark)
26 Wide region of sensor signal (bright)
29 One value of the sensor signal
30 Higher value/day illumination setting
31 Low value/night illumination setting
32, 32' Double headed arrows

What is claimed is:

1. A long-range optical sighting device, in particular a telescopic sight, comprising:
   a housing, wherein
      the housing comprises an objective, an eyepiece, a reversing system and a target mark and which has target mark illumination that is switchable and controllable via an operating platform,
      the operating platform has one or a plurality of manually actuatable switches arranged on the housing in the region of the eyepiece, on the top of the housing in the operating position, and a power supply, control electronics and a light-sensitive sensor system for detecting the ambient brightness are integrated in the operating platform and/or the housing in the region of the eyepiece,
      the operating platform comprises one or a plurality of light entrance openings for the light-sensitive sensor system in the direction of the objective, the one or the plurality of light entrance openings are configured to detect light that is directly aligned with the scenery observed with the telescopic sight, and
      a paired arrangement of the sensors causes an overlap of a photogeometric sensitivity range proximate to the optical axis of the long-range optical sighting device for the weighting of a central region in the obervation direction.

2. The long-range optical sighting device as claimed in claim 1, wherein the one or the plurality of light entrance openings is/are arranged in an edge region of the operating platform.

3. The long-range optical sighting device as claimed in claim 1, wherein the light-sensitive sensor system is inserted in recesses in the operating platform and is connected to the control electronics.

4. The long-range optical sighting device as claimed in claim 1, wherein the one or the plurality of light entrance openings comprises an optical unit for guiding light onto one or a plurality of light sensitive sensors.

5. The long-range optical sighting device as claimed in claim 4, wherein light reception beams are shaped by the optical unit in the light entrance opening or the light entrance openings arranged at a distance from one another in such a way as to be directed in the objective direction, past possible adjustment turrets of a reticle adjustment or an outer edge region of the objective, at the space observed through the objective.

6. The long-range optical sighting device as claimed in claim 1, wherein the intensity of the target mark illumination is controllable either manually via the switches or automatically by the control electronics, depending on the ambient light conditions determined with the aid of the light-sensitive sensor system.

7. The long-range optical sighting device as claimed in claim 1, wherein the control electronics comprise two or more characteristic curves which are selectable via switch positions and which have different or variable levels for the intensity of the target mark illumination.

8. The long-range optical sighting device as claimed in claim 7, wherein the respective level of the intensity of the automatic target mark illumination that is assigned to the switch positions is individually variable by means of further operating elements or via an external programming interface.

9. The long-range optical sighting device as claimed in claim 1, wherein the arrangement of the sensors is configured for direct electrical connection, or electrical connection via a short line path, to the control electronics in the operating platform.

10. The long-range optical sighting device as claimed in claim 1, further comprising: operating turrets, wherein
the operating turrets are arranged either in front of the operating platform, or between the operating platform and the target.

11. A long-range optical sighting device, in particular a telescopic sight, comprising:
a housing, which comprises an objective, an eyepiece, a reversing system and a target mark and which has target mark illumination that is switchable and controllable via an operating platform, wherein
the operating platform has one or a plurality of manually actuatable switches arranged on the housing in the region of the eyepiece, on the top of the housing in the operating position, and a power supply, control electronics and a light-sensitive sensor system for detecting the ambient brightness are integrated in the operating platform and/or the housing in the region of the eyepiece,
the operating platform comprises one or a plurality of light entrance openings for the light-sensitive sensor system in the direction of the objective, and
a paired arrangement of the sensors ensures an overlap of a photogeometric sensitivity range near the optical axis of the long-range optical sighting device for the weighting of a central region in the observation direction.

12. The long-range optical sighting device as claimed in claim 11, wherein the one or the plurality of light entrance openings is/are arranged in an edge region of the operating platform.

13. The long-range optical sighting device as claimed in claim 11, wherein the light-sensitive sensor system is inserted in recesses in the operating platform and is connected to the control electronics.

14. The long-range optical sighting device as claimed in claim 11, wherein the one or the plurality of light entrance openings comprises an optical unit for guiding light onto one or a plurality of light sensitive sensors.

15. The long-range optical sighting device as claimed in claim 14, wherein light reception beams are shaped by the optical unit in the light entrance opening or the light entrance openings arranged at a distance from one another in such a way as to be directed in the objective direction, past possible adjustment turrets of a reticle adjustment or an outer edge region of the objective, at the space observed through the objective.

16. The long-range optical sighting device as claimed in claim 11, wherein the intensity of the target mark illumination is controllable either manually via the switches or automatically by the control electronics, depending on the ambient light conditions determined with the aid of the light-sensitive sensor system.

17. The long-range optical sighting device as claimed in claim 11, wherein the control electronics comprise two or more characteristic curves which are selectable via switch positions and which have different or variable levels for the intensity of the target mark illumination.

18. The long-range optical sighting device as claimed in claim 17, wherein the respective level of the intensity of the automatic target mark illumination that is assigned to the switch positions is individually variable by means of further operating elements or via an external programming interface.

19. The long-range optical sighting device as claimed in claim 11, wherein the arrangement of the sensors is configured for direct electrical connection, or electrical connection via a short line path, to the control electronics in the operating platform.

* * * * *